(12) United States Patent
Sundararajan et al.

(10) Patent No.: US 12,283,751 B2
(45) Date of Patent: Apr. 22, 2025

(54) 8T8R QUASI-OMNIDIRECTIONAL ANTENNA

(71) Applicant: John Mezzalingua Associates, LLC, Liverpool, NY (US)

(72) Inventors: Niranjan Sundararajan, Clay, NY (US); Evan Wayton, Tully, NY (US)

(73) Assignee: John Mezzalingua Associates, LLC, Liverpool, NY (US)

( * ) Notice: Subject to any disclaimer, the term of this patent is extended or adjusted under 35 U.S.C. 154(b) by 53 days.

(21) Appl. No.: 17/858,243

(22) Filed: Jul. 6, 2022

(65) Prior Publication Data
US 2023/0010745 A1     Jan. 12, 2023

Related U.S. Application Data

(60) Provisional application No. 63/218,631, filed on Jul. 6, 2021.

(51) Int. Cl.
| | | |
|---|---|---|
| *H01Q 21/06* | (2006.01) |
| *H01Q 5/371* | (2015.01) |
| *H01Q 21/08* | (2006.01) |
| *H04B 7/06* | (2006.01) |

(52) U.S. Cl.
CPC .......... *H01Q 21/062* (2013.01); *H01Q 5/371* (2015.01); *H01Q 21/08* (2013.01); *H04B 7/0695* (2013.01)

(58) Field of Classification Search
CPC ...... H01Q 21/062; H01Q 5/371; H01Q 21/08; H01Q 1/246; H01Q 3/242; H01Q 21/205; H01Q 21/28; H01Q 25/00; H04B 7/0695
See application file for complete search history.

(56) References Cited

U.S. PATENT DOCUMENTS

| | | | |
|---|---|---|---|
| 6,172,654 B1 * | 1/2001 | Martek | H01Q 11/08 |
| | | | 343/893 |
| 9,960,825 B2 * | 5/2018 | Manholm | H04B 7/0452 |
| 10,505,609 B2 | 12/2019 | Zimmerman | |
| 10,923,812 B1 * | 2/2021 | Schwartz | H01Q 1/44 |
| 11,233,335 B2 * | 1/2022 | Li | H04B 7/0617 |
| 2005/0110699 A1 | 5/2005 | Timofeev et al. | |
| 2011/0007685 A1 | 1/2011 | Ma et al. | |
| 2016/0050002 A1 | 2/2016 | Wei et al. | |

(Continued)

OTHER PUBLICATIONS

International Search Report and Written Opinion issued for Application No. PCT/US2022/036186, dated Nov. 2, 2022.

(Continued)

*Primary Examiner* — Seung H Lee
(74) *Attorney, Agent, or Firm* — Meunier Carlin & Curfman LLC (57) ABSTRACT

Disclosed is a quasi-omnidirectional antenna having three array faces, wherein each of the three array faces has a radiator array having a plurality of radiator columns. Each of the corresponding radiator columns on the radiator arrays are coupled together to a single pair of antenna ports, one per polarization. This results in a service beam having three gain lobes that can be swept in unison in a scan. By scanning the service beam, the antenna may enable a high-gain connection to a mobile device, emulating a high gain omnidirectional antenna. Further disclosed is a variation having four array faces spaced 90 degrees apart, which offers additional performance benefits.

5 Claims, 7 Drawing Sheets

(56) References Cited

U.S. PATENT DOCUMENTS

| | | |
|---|---|---|
| 2018/0227775 A1 | 8/2018 | Bisiules et al. |
| 2018/0367199 A1 | 12/2018 | Zimmerman |
| 2020/0321700 A1 | 10/2020 | Wu et al. |

OTHER PUBLICATIONS

European Search Report in connection to European patent application No. 22838328.7, dated Mar. 6, 2025. 14 pages.

\* cited by examiner

Service beams

8T8R QUASI-OMNIDIRECTIONAL ANTENNA

CROSS REFERENCE TO RELATED APPLICATIONS

This application claims the priority benefit of and is a non-provisional of U.S. Provisional Application Ser. No. 63/218,631, filed Jul. 6, 2021, which application is hereby incorporated by this reference in its entirety for all purposes as if fully set forth herein.

BACKGROUND OF THE DISCLOSURE

Field of the Disclosure

The present disclosure relates to wireless communications, and more particularly, to omnidirectional antennas.

Background

Modern cellular communications require that individual antennas maintain RF links with a multitude of mobile devices (known as User Equipment or "UEs"). For urban deployments, omnidirectional antennas are preferred because they can service UEs with 360 degree azimuthal coverage. Conventional quasi-omnidirectional antennas have a cylindrical radome containing three substantially identical panels angularly spaced at 120 degrees. Each of the panels has at least one array face, each array face having radiator elements configured to operate at a particular frequency band. For example, each panel may support a first array of midband radiators configured to operate at 1.7-2.7 GHz; a second array configured to operate in CBRS (Citizens Broadband Radio Service) frequency bands of 3.4-3.8 GHz; and a third array configured to operate in the C-Band (4-8 GHz) using an 8T8R (Eight Transmit Eight Receive) configuration.

A conventional 8T8R array face has an array of C-Band radiators arranged in four radiator columns Each of the C-Band radiators is configured to operate at two orthogonal polarizations capable of transmitting and receiving independent signals. Under conventional 8T8R operation, each of the radiator columns operates independently such that each has a gain pattern main lobe of approximately 90-100 degrees. Accordingly, having three panels spaced 120 degrees apart, the C-Band 8T8R arrays combine to form a quasi-omnidirectional gain pattern.

Figure 1:
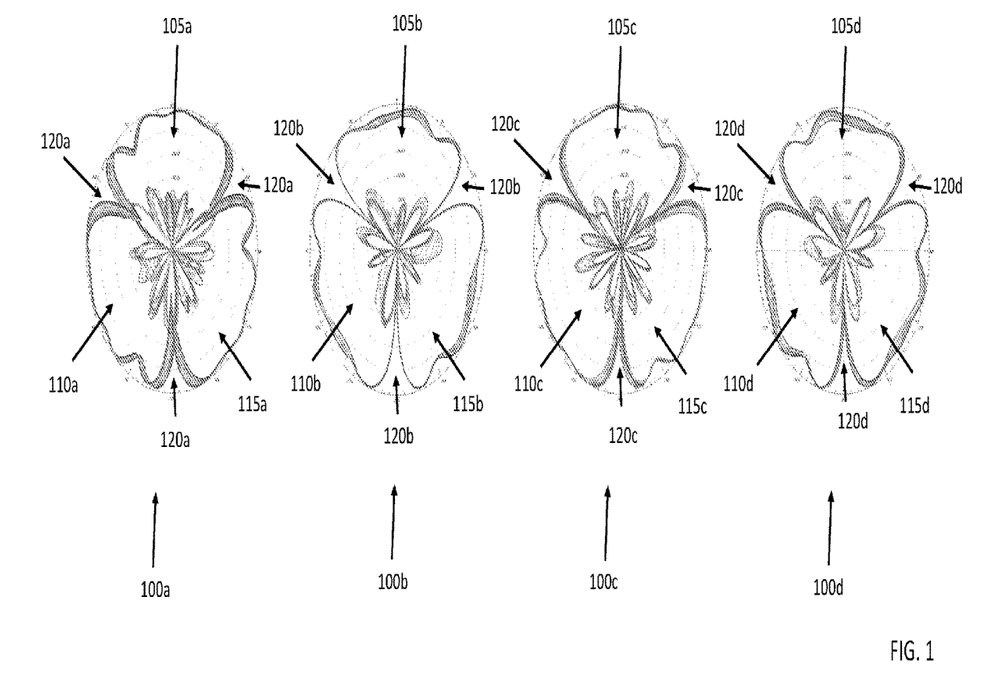
FIG. 1 illustrates four exemplary conventional gain patterns representing an azimuthal gain pattern of one of the four C-Band 8T8R radiator columns for all three of the array faces angularly spaced at 120 degrees.

FIG. 1 illustrates four exemplary conventional gain patterns 100a, 100b, 100c, 100d, each representing an azimuthal gain pattern of one of the four C-Band 8T8R radiator columns for all three of the array faces angularly spaced at 120 degrees. Each of the conventional gain patterns 100a-d is composed of three individual gain lobes 105a-d, 110a-d, and 115a-d. The sum of the three gain lobes forms a conventional quasi-omni gain pattern. However, it is apparent that there are deficiencies to conventional quasi-omni antenna structure. First, the quasi-omni gain is limited by the gain of a single C-Band radiator column, given that the gain patterns 100a-d are formed of distinct and (generally) non-overlapping individual gain lobes 105a-d, 110a-d, and 115a-d. Second, distributing the signal to three C-Band arrays results in an approximate 4-5 dB gain reduction. This is referred to as "omnification loss". Third, it is apparent from the illustrations of FIG. 1 that each conventional gain pattern 100a-d suffers from nulls 120a-d.

Accordingly, what is needed is an antenna with a quasi-omni coverage with improved gain, and which doesn't suffer from the nulls endemic to conventional approaches.

SUMMARY OF THE DISCLOSURE

Accordingly, the present disclosure is directed to an 8T8R Quasi-Omnidirectional Antenna that obviates one or more of the problems due to limitations and disadvantages of the related art.

An aspect of the present disclosure involves an antenna that comprises a plurality of array faces spaced apart by an angular spacing, each of the array faces having a radiator array disposed thereon, each of the radiator arrays having a plurality of radiator columns, each of the plurality of radiator columns having a plurality of radiators, and each of the plurality of radiators having a pair of dipoles configured to radiate respectively in a first polarization and a second polarization, wherein each of the corresponding radiator columns of the plurality of radiator arrays is coupled to two antenna ports, a first of the two antenna ports corresponding to the first polarization and the second of the two antenna ports corresponding to the second polarization.

Another aspect of the present disclosure involves a method of establishing a wireless connection between a base station and a mobile device. The method comprises scanning a service beam through a plurality of scan angles, the service beam having a plurality of gain lobes, wherein the plurality of gain lobes move in unison; transmitting a unique scan index with each scan angle, the scan index corresponding to the scan angle; receiving a feedback from the mobile device, the feedback indicating a first index corresponding to a highest quality received scan angle; and establishing a mobile device-specific beam having a scan angle corresponding to the first index.

Additional advantages of the 8T8R Quasi-Omnidirectional Antenna will be set forth in part in the description which follows, and in part will be obvious from the description, or may be learned by practice of the 8T8R Quasi-Omnidirectional Antenna. The advantages of the 8T8R Quasi-Omnidirectional Antenna will be realized and attained by means of the elements and combinations particularly pointed out in the appended claims. It is to be understood that both the foregoing general description and the following detailed description are exemplary and explanatory only and are not restrictive of the invention, as claimed.

Further embodiments, features, and advantages of the 8T8R Quasi-Omnidirectional Antenna, as well as the structure and operation of the various embodiments of the 8T8R Quasi-Omnidirectional Antenna, are described in detail below with reference to the accompanying drawings.

It is to be understood that both the foregoing general description and the following detailed description are exemplary and explanatory only, and are not restrictive of the invention as claimed.

BRIEF DESCRIPTION OF THE DRAWINGS

The accompanying figures, which are incorporated herein and form part of the specification, illustrate 8T8R Quasi-Omnidirectional Antenna. Together with the description, the figures further serve to explain the principles of the 8T8R Quasi-Omnidirectional Antenna described herein and thereby enable a person skilled in the pertinent art to make and use the 8T8R Quasi-Omnidirectional Antenna.

DESCRIPTION OF EXEMPLARY EMBODIMENTS

Reference will now be made in detail to embodiments of the 8T8R Quasi-Omnidirectional Antenna with reference to the accompanying figures The same reference numbers in different drawings may identify the same or similar elements.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions, and arrangement of the exemplary embodiments without departing from the scope of the present disclosure.

Figure 2:
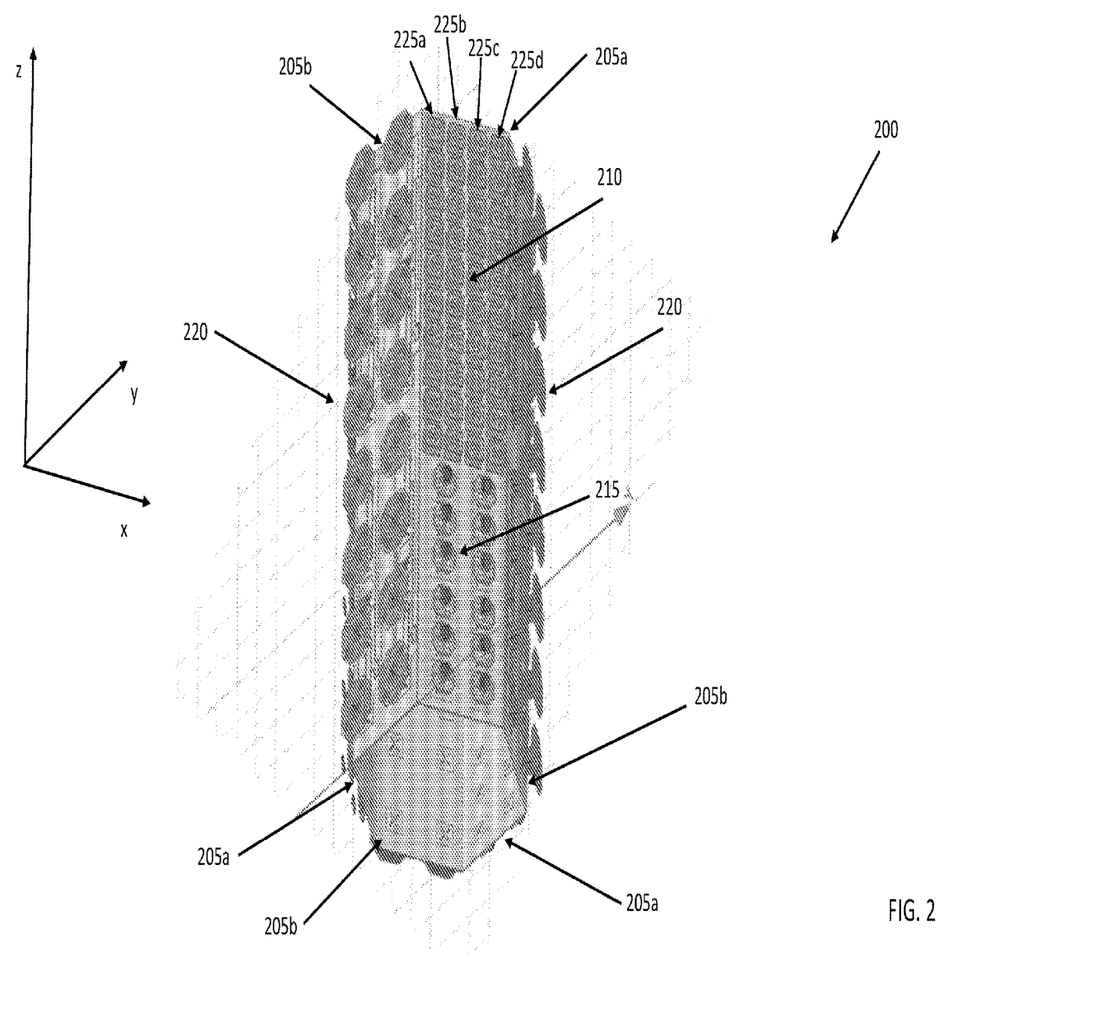
FIG. 2 illustrates an exemplary quasi-omni antenna according to the disclosure.

FIG. 2 illustrates a quasi-omni antenna 200 according to the disclosure. Antenna 200 has six array faces arranged in a hexagonal pattern, including three first array faces 205a having a C-Band 8T8R array 210 and a CBRS array 215, and three second array faces 205b having a midband array 220. First array faces 205a and second array faces 205b are arranged such that the first array faces 205a are angularly spaced at 120 degrees, and the second array faces 205b are angularly spaced at 120 degrees.

Each first array face 205a has four C-Band radiator columns 225a-d. Each of the radiator columns 225a-d may be coupled to two RF ports, one per polarization, given that each of the C-Band radiators has two dipoles, one per polarization (e.g., +/−45 degrees). Accordingly, for each polarization, it is possible to provide differential amplitude and phase weighting to a single RF signal such that beamforming may be implemented on each C-Band array 210. In doing so, the beam formed by the superposition of all four C-Band radiator columns 225a-d may be steered in the azimuth plane.

Further illustrated in FIG. 2 is a set of x, y, z axes that define the coordinates of the first array face 205a shown in the figure. As illustrated, the z axis may be defined as the elevation axis, the x axis may be defined as the azimuth axis, the y axis may be defined perpendicular to the surface of first array face 205a, and the azimuth plane may be defined by the x and y axes.

Figure 3:
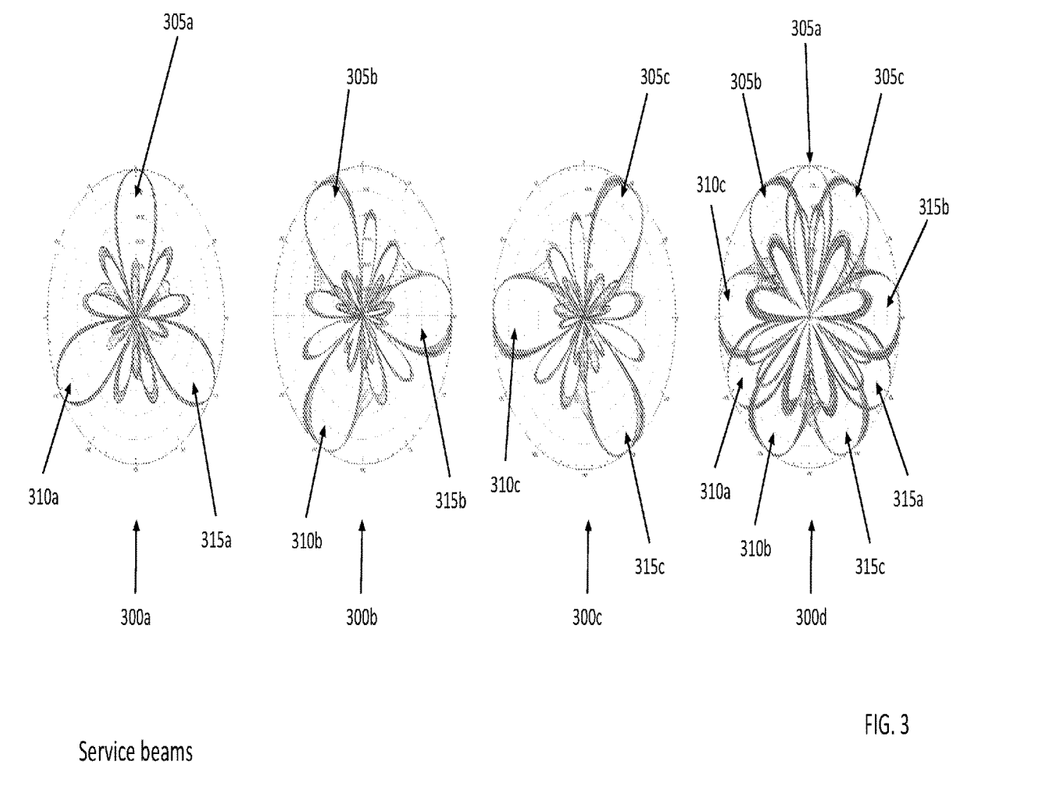
FIG. 3 illustrates a plurality of service beams created by beamforming using the four C-Band radiator columns for each of the array faces, and a combined service beam that is formed by temporally summing the service beams.

FIG. 3 illustrates a plurality of service beams 300a-c created by beamforming using the four C-Band radiator columns 225a-d for each of the first array faces 205a, and a combined service beam 300d that is formed by temporally summing service beams 300a-c. Combined service beam 300d represents the angular region which can be provided service upon the use of azimuth beamforming using this configuration for a maximum azimuth tilt range of +−30 degrees.

Service beam 300a has three gain lobes 305a, 310a, and 315a, each of which are angularly spaced at 120 degrees. Each of the three gain lobes 315a, 310a, 315a are respectively generated by a C-Band array 210 disposed on corresponding first array faces 205a. As described above, each of the C-Band arrays 210 has four C-band radiator columns 225a-d, each of which is coupled to two RF ports, one per orthogonal polarization. Accordingly, during beamforming to generate the service beam, for a given polarization, all of the C-Band radiator columns 225a-d are coupled to a single RF signal source. With this arrangement, all three gain lobes 305a, 310a, and 315a, correspond to a single RF signal.

However, as is described below, although each of the four C-Band radiator columns 225a-d are fed the same signal, they are each individually subject to differential amplitude and phase weighting. This amplitude and phase weighting may be performed within a base station (not shown) and may be done digitally, in analog, or in a combination (hybrid beamforming). Regardless, due to the fact that the RF signal being fed to the four C-Band radiator columns 225a-d ultimately correspond to the same RF signal, because each is subject to different amplitude and phase weightings, they each are fed by an individual corresponding antenna port. Hence for each C-Band array 210, eight antenna ports are used (two per C-Band radiator column 225a-d, each of which corresponding to an orthogonal polarization). Further, the fact that the four C-Band radiator columns 225a-d are correspondingly coupled together across the three C-Band arrays 210 (one per first array face 205a) yields two features: (1) eight ports are used, which is in keeping with the 8T8R function; and (2) the three gain lobes 305a-c, 310a-c, 315a-c move in unison in response to differential amplitude and phase weighting. Accordingly, the service beams 300a-c may be rotationally scanned.

Service beam 300b is substantially similar to service beam 300a, but differential amplitude and phase weights have been applied to the RF signals coupled to each of the four radiator columns 225a-d of all three first array faces 205a such that all three gain lobes 305b, 310b, 315b are steered by −30 degrees. This is in contrast to service beam 300a, for which no differential amplitude and phase weights have been applied.

Service beam 300c is substantially similar to service beam 300a, but differential amplitude and phase weights have been applied to the RF signals coupled to each of the four radiator columns 225a-d such that all three gain lobes 305c, 310c, 315c are steered by 30 degrees. All three respective gain lobes 305a-c, 310a-c, 315a-c are steered in unison, due to the manner in which respective radiator columns 225a-d are coupled together and to their respective signal sources. This is described further below.

Although FIG. 3 depicts three scan angles for the service beams (0 degrees, −30 degrees, +30 degrees), it will be understood that the service beam may be scanned at various angular resolutions and angular rates, restricted by the angular resolution of the circuitry and/or software performing the differential amplitude and phase weighting, transmit time intervals, and other factors. However, a scan limit of +/−30 degrees may be preferable to prevent grating/side lobes of each of the gain lobes 305a-c, 310a-c, 315a-c from interfering with each other.

FIG. 3 further illustrates a combined service beam 300d that is formed by temporally summing service beams 300a-c. As illustrated, combined service bean 300d does not suffer from the nulls 120a-d as depicted in FIG. 1. Further, combined service beam 300d is the summation of three service beams 300a-c. Given this, if the service beam is scanned in a higher angular resolution, then the superposition of the total number of service beams would eliminate nulls even more effectively.

A further advantage of scanning the service beams 305a-c is that the gain of each gain lobe 305a-c, 310a-c, 315a-c may be 15 dB higher than the gain of conventional gain lobes 105a-d, 110a-d, 115a-d. In combining the RF signals such that the same RF signal is fed to C-Band arrays 210 of all three first array faces 205a. This may incur an efficiency loss (omnification loss) due to the fact that a given RF signal is being split and distributed to three C-Band arrays 210, whereby an RF signal intended for one UE is fed to all three C-Band arrays 210, even though only one C-Band array will establish a link with the given UE at any given time. However, this one-third (4-5 dB) loss in power efficiency is more than made up for by the 15 dB gain increase of the antenna 200 of the disclosure. This may significantly expand the usable range of antenna 200 relative to a conventional antenna.

As used herein, when service beam scanning is described, it may be referred to as scanning of the service beam 305a. In this case, service beams 305b and 305c may be service beam 305a at different scan angles.

Figure 4:
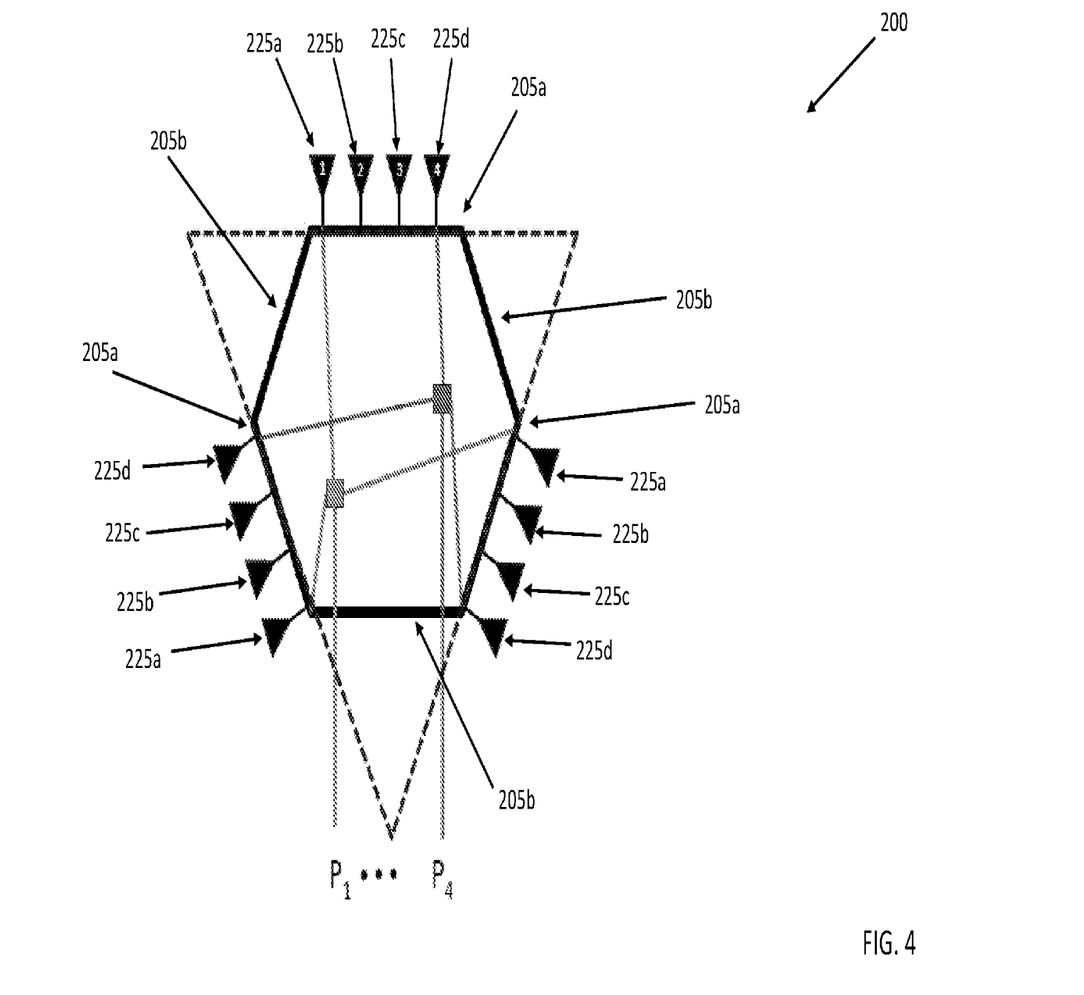
FIG. 4 illustrates a view of the exemplary antenna along an elevation (z) axis.

FIG. 4 illustrates a view of exemplary antenna 200 along the elevation (z) axis. Shown are first array faces 205a and second array faces 205b, although CBRS array 215 and midband array 220 are omitted. Disposed on each first array face 205a are four radiator columns 225a-d. Illustrated are antenna ports P1 . . . P4, whereby antenna port P1 is coupled to each of the three radiator columns 225a, and antenna port P4 is coupled to each of the three radiator columns 225d. Although not shown, it is implied that an antenna port P2 is coupled to each of the three radiator columns 225b, and an antenna port P3 is coupled to each of the three radiator columns 225c. By coupling the four RF ports P1 . . . P4 respectively to radiator columns 225a-d, it is possible to scan the service beam 300a-c as illustrated in FIG. 3, whereby the gain lobes 305a-c, 310a-c, 310a-c are scanned in unison. It will be understood that FIG. 4 illustrates antenna port coupling for one of the two polarization states supported by the three C-Band arrays 210 respectively disposed on first array faces 205a.

Figure 5:
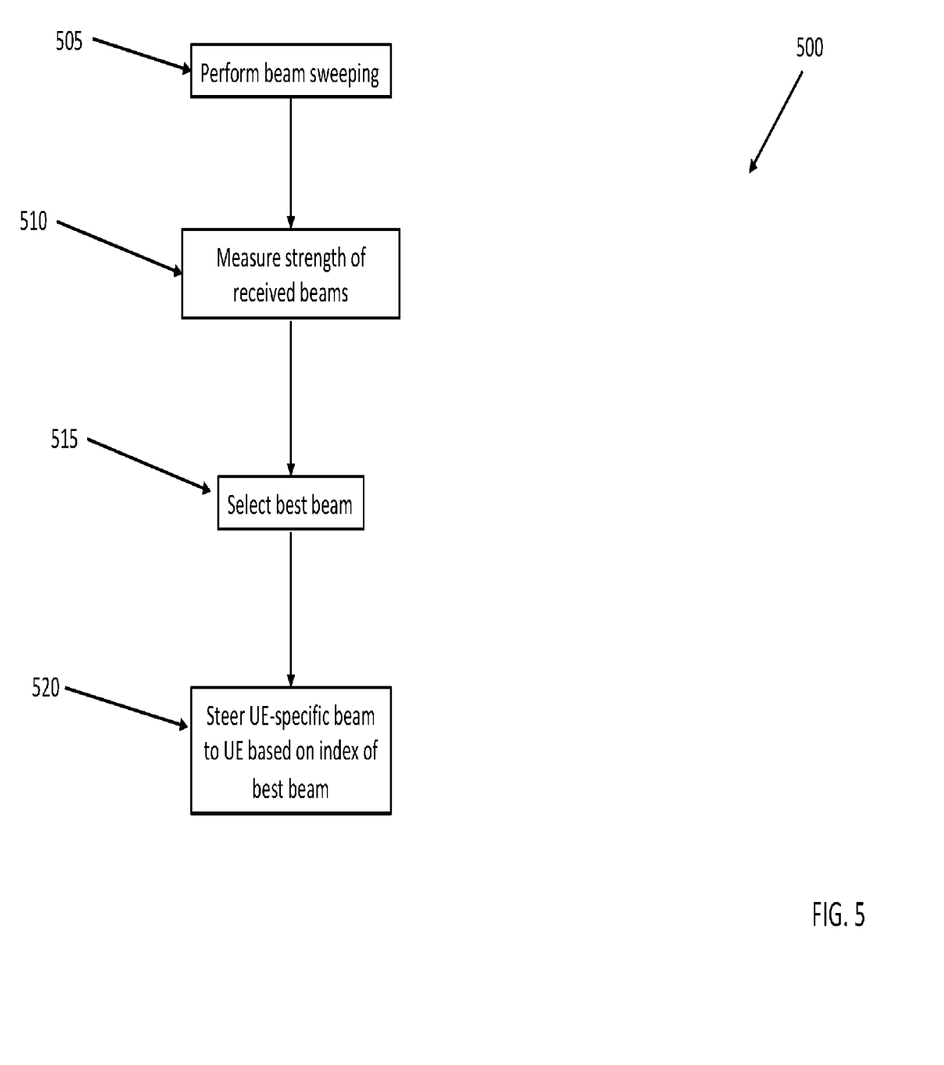
FIG. 5 illustrates an exemplary process by which the disclosed service beam scanning may be performed by a 5G gNodeB base station using the exemplary antenna of the disclosure.

FIG. 5 illustrates an exemplary process 500 by which the disclosed service beam scanning may be performed by a 5G gNodeB base station (not shown) using exemplary antenna 200.

In step 505, the gNodeB performs beam sweeping, in which it executes instructions to scan service beam 300a at a plurality of scan angles. Although FIG. 3 shows three scan angles, the beam sweep performed in step 505 may have a multitude of scan angles such that there is significant overlap between adjacent gain lobes in successive scan angles. For example, instead of 30 degree increments, the scan angle increments in step 505 may be of finer angular resolution, such as 10 degrees or finer. For each scan angle, gNodeB may embed a unique scan angle index (e.g., 1 . . . m, wherein m is the number of scan angles) within the signal transmitted at the given scan angle. One example way of determining scan resolution is to select scan angle spacing such that the azimuth angle of the peak of one gain lobe may coincide with the azimuth angle of the 3 dB point of the adjacent gain lobe.

Although the disclosed antenna has four C-Band radiator columns 225a-d, it will be understood that more columns may be used, which may 'tighten' the width of each gain lobe and thereby increase its gain, while enabling a finer angular resolution in scan angle. It will be understood that such variations are possible and within the scope of the disclosure.

In step 510, the UE may measure the received power or received quality of the one or more scanned service beams 300a it received. This may include comparing the received power to a predefined threshold value for RSRP (Reference Signal Received Power) that is provided by the gNodeB. Depending on the angular resolution of the scan, a given UE may receive a plurality of service beams, each at an adjacent scan angle.

In step 515, the UE may select the scan angle index of the service beam corresponding to the mean with the highest received power or otherwise highest received signal quality.

In step 520, the UE may transmit to the gNodeB the selected scan angle index. The gNodeB may use the received scan angle index to direct a UE-specific beam to the UE.

Figure 6:
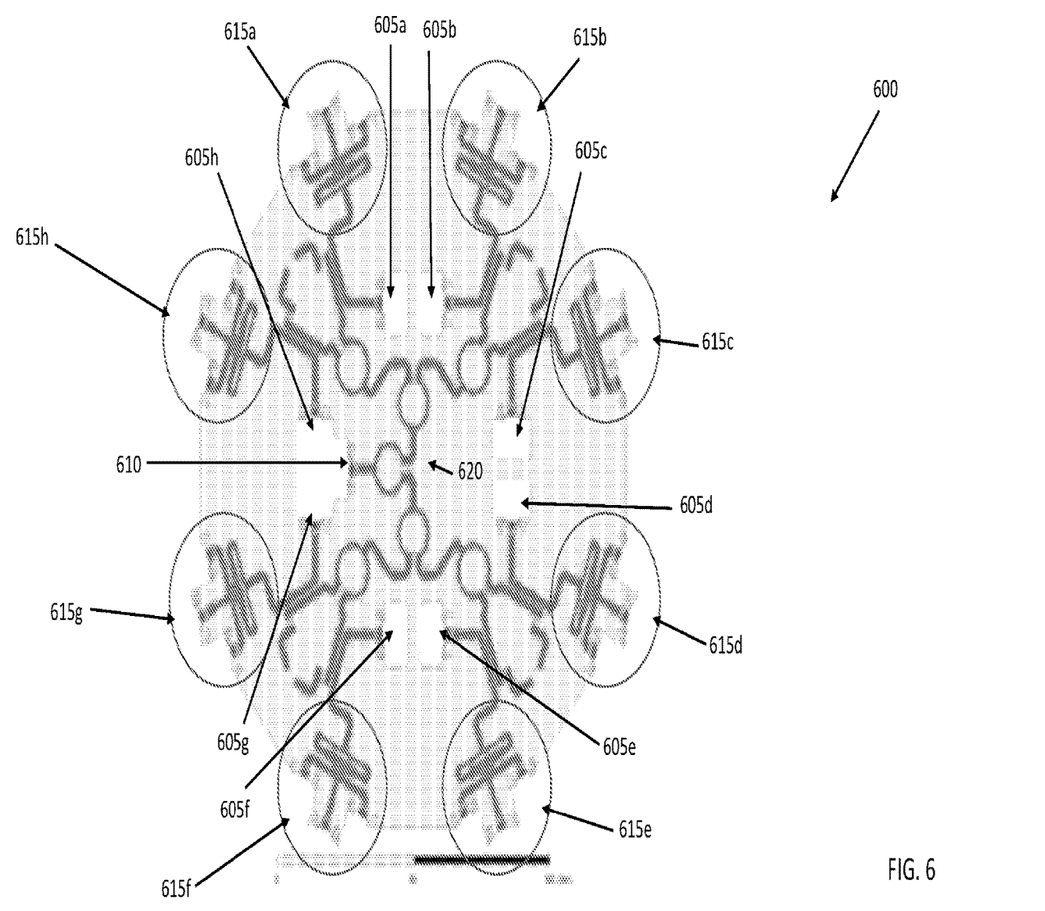
FIG. 6 illustrates an exemplary calibration board that can provide signal coupling between the eight antenna ports of the three C-Band arrays.

FIG. 6 illustrates an exemplary calibration board 600 that may provide signal coupling between the eight antenna ports of the three C-Band arrays 210. Calibration board 600 has eight signal inputs 605a-h, and a calibration port 610; a power divider circuit 620 that detects a balance or imbalance of input power and phase and provides the result of that detection to calibration port 610; and eight three-way splitters 615a-h, each coupled to corresponding signal input 605a-h. Each of the signal inputs 605a-h may correspond to one of the four radiator columns 225a-d for each of two orthogonal polarizations. Each of the signal inputs 605a-h is coupled to a corresponding three-way splitter 615a-h, which evenly splits the RF signal so that each of the three outputs can be coupled to a corresponding radiator column 225a-d on each of the three C-Band arrays 210.

The calibration board 600 may be employed when there is no beam steering—e.g., no differential amplitude and phase weighting being applied to the eight RF signal inputs 605a-h. In this scenario, the RF signal strength should be uniform across all inputs 605a-h. An imbalance (e.g., due to an anomaly or failure in any of the C-Band arrays 210, or in any circuitry upstream of the 3-way splitter, or to a phase and amplitude imbalance due to different cable lengths between antenna 200 and a base station at the base of the tower to which antenna 200 is mounted,) would be indicated by a signal present on calibration port 610. A further description of calibration board operation may be found in U.S. patent application 63/084,889, INTEGRATED AND PHASE-COMPENSATED BASE STATION ANTENNA PHASE SHIFTER AND CALIBRATION BOARD, which is incorporated by reference as if fully disclosed herein.

Figure 7:
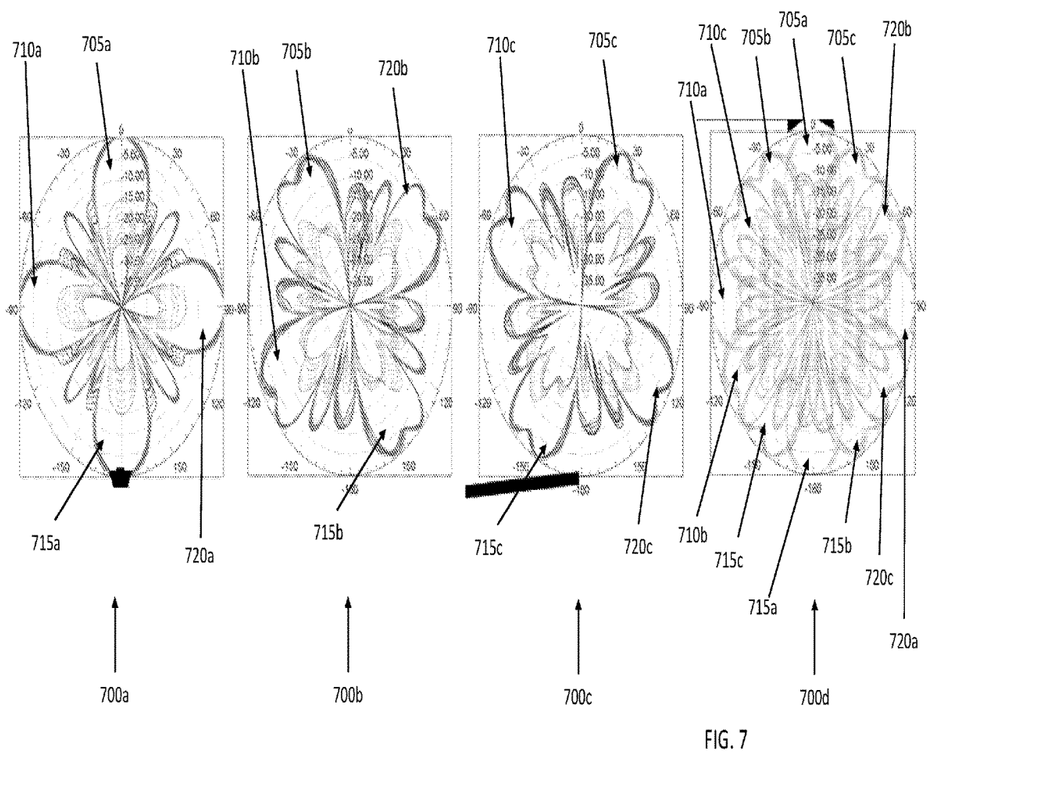
FIG. 7 illustrates a plurality of scan beams generated by an exemplary antenna of the present disclosure that has four array faces, each with a C-Band array, that are spaced 90 degrees apart.

FIG. 7 illustrates a plurality of scan beams 700a-d generated by an exemplary antenna of the present disclosure that has four array faces, each with a C-Band array, that are spaced 90 degrees apart. A key difference between this variation and antenna 200 is that instead of three gain lobes spaced at 120 degrees, there are four gain lobes spaced at 90 degrees. The C-Band arrays and C-Band radiator columns of the antenna configured to generate service beams 700a-c may be identical to C-Band array 210 and C-Band radiator columns 225a-d of antenna 200. Each of the individual C-Band radiator columns is coupled to its corresponding C-Band radiator column in the other three C-Band arrays. Accordingly, instead of splitting an individual RF port signal three ways, it is split four ways, one per C-Band array disposed the four array faces that are spaced at 90 degrees.

Service beam 700a shows a default configuration, similar to service beam 300a, in which the RF signals input to the C-Band radiator columns are the same and unmodified by differential amplitude and phase weighting. The four gain lobes 705a, 710a, 715a, 720a each correspond to a C-Band array. Service beam 700b is generated by appropriately applying differential amplitude and phase weighting to steer service beam 700a by −30 degrees; and service beam 700c is generated by appropriately applying differential amplitude and phase weighting to steer service beam 700a by +30 degrees.

An advantage of this variation is that service beam 700a (and its rotated counterpart beams 700b and 700c) have the same azimuth beamwidth as service beam 300a, but the coverage of service beam 700a is broader and has a greater coverage area. Similarly, the nulls of service beam 700a are less pronounced than those of service beam 300a.

Combined service beam 700d is formed by temporally summing service beams 700a-c, in a manner similar to combined service beam 300d. It will be readily apparent that the coverage of combined service beam 700d has more comprehensive coverage and much less pronounced nulls than combined service beam 300d.

The performance improvement of the exemplary antenna that generates service beams 700a-d may come at the expense of an additional component count—e.g., an additional C-Band array—and related support circuitry.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents.

What is claimed is:

1. An antenna, comprising:
a plurality of array faces spaced apart by an angular spacing, each of the array faces having a radiator array disposed thereon, each of the radiator arrays having a plurality of radiator columns, each of the plurality of radiator columns having a plurality of radiators, and each of the plurality of radiators having a pair of dipoles configured to radiate respectively in a first polarization and a second polarization,
wherein each respective radiator column of the plurality of radiator arrays is coupled to two antenna ports, a first of the two antenna ports corresponding to the first polarization and a second of the two antenna ports corresponding to the second polarization, and wherein the antenna is configured to provide a radiation pattern comprising a plurality of gain lobes that move in unison in response to differential amplitude and phase weighting performed by a base station.

2. The antenna of claim 1, further comprising a calibration board, wherein the calibration board comprises:
a plurality of inputs, wherein a number of the plurality of inputs corresponds to twice a number of the plurality of radiator columns;
a calibration port;
a power divider circuit coupled to the plurality of inputs and the calibration port; and
a plurality of signal splitters, each of the signal splitters coupled to a corresponding input within the plurality of inputs via the power divider circuit, and each of the plurality of signal splitters having a number of signal outputs corresponding to a number of the plurality of array faces.

3. The antenna of claim 1, wherein the plurality of array faces comprises three array faces, and wherein the angular spacing is 120 degrees.

4. The antenna of claim 1, wherein the plurality of array faces comprises four array faces, and wherein the angular spacing is 90 degrees.

5. The antenna of claim 1, wherein the plurality of radiator columns comprises four radiator columns.

\* \* \* \* \*